United States Patent [19]

Genchev et al.

[11] 4,092,910
[45] June 6, 1978

[54] MACHINE FOR VACUUM PEELING FRUITS AND VEGETABLES

[75] Inventors: Lyubomir Nikolov Genchev; Iliya Chudomirov Kafedjiev; Kostadin Spirov Klyamov, all of Plovdiv, Bulgaria

[73] Assignee: DSO "Bulgarplod", Sofia, Bulgaria

[21] Appl. No.: 636,073

[22] Filed: Nov. 28, 1975

[51] Int. Cl.² .................................................. A23N 7/01
[52] U.S. Cl. ................................... 99/472; 99/483; 99/516; 99/584
[58] Field of Search .................. 99/472, 483, 470, 454, 99/536, 576, 540, 584; 53/86, 91, 95; 141/62, 65; 426/481, 509

[56] References Cited

U.S. PATENT DOCUMENTS

| 3,115,915 | 12/1963 | Steber | 99/584 |
| 3,769,439 | 10/1973 | Kafejiev | 99/472 |

FOREIGN PATENT DOCUMENTS

| 414,553 | 8/1946 | Italy | 99/472 |

*Primary Examiner*—Harvey C. Hornsby
*Assistant Examiner*—Robert Pous

[57] ABSTRACT

Apparatus for vacuum peeling fruits and vegetables. The apparatus has a tank adapted to contain treating liquid, means for heating such liquid, a rotor mounted within the tank for rotation about a horizontal axis, the rotor being provided with a plurality of angularly spaced buckets for receiving the fruits and vegetables to be treated, the buckets having open radially inner and outer ends, coaxial radial inner and outer perforated cylinders within the tank between which the buckets move as the rotor rotates, the perforated cylinders closing the respective open ends of the buckets against the escape of fruits and vegetables therefrom, means for intermittently rotating the rotor so as to advance the buckets through the treating liquid in a series of steps, and a vacuum applying station into which the buckets are successively moved after they emerge from the treating liquid. The means for intermittently rotating the rotor provides a dwell period in which the buckets are disposed in the vacuum applying station. The apparatus has a delivery chute for charging fruits and vegetables into the buckets, and a removal chute for discharging fruits and vegetables after they have been treated to vacuum in the vacuum applying station.

4 Claims, 4 Drawing Figures

MACHINE FOR VACUUM PEELING FRUITS AND VEGETABLES

This invention relates to a machine for vacuum peeling fruits and vegetables.

There is known a machine for peeling fruits and vegetables of the vacuum-linear type with a vacuum chamber, which performs a reciprocating motion. In such machine the fruits are delivered in portions into the buckets of a periodically moving conveyor, which conveys them through the heaters to the vacuum chamber, where the fruits are peeled under the action of vacuum. It is a drawback of this design that the fruits fall out of the buckets, floating upon the surface of the liquid inside the heater.

In another similar linear-type design, the conveyor moves continuously, while the vacuum chamber is immovable and is provided with inlet and outlet sealing doors. However, this design has difficulties in the construction of the sealing doors and, moreover, their operation is not reliable in service.

There is also known a peeling machine of the vacuum-turntable type, which comprises a drum-type heater and a turntable with working chambers. The fruits are treated inside the heater, pass into the working chambers of the turntable, and are conveyed to the vacuum chamber for vacuumizing (peeling). This design is featured by its considerable overall size and the prolonged time required for the treatment of the fruit.

A further vacuum peeling machine of the rotational type is known in which the fruits are heated in advance, and are then fed into the chambers of the rotor, which conveys them through the vacuum chamber and then to the gate for removal of the peeled fruits. The basic drawbacks of this design are the difficulties involved in sealing the rotating rotor inside the drum and in its reliable maintenance during operation.

It is therefore a general object of the present invention to avoid the drawbacks of the aforedescribed machines by providing a machine of simplified design for continuous operation which provides an abrupt generation of vacuum and a minimum time between the end of heating and the beginning of evacuation. It is a further object of the invention to provide a versatile peeling machine which by a fast and easy change in the working conditions effects the peeling of different fruits and vegetables.

These objects are achieved by disposing the rotor of the machine for the vacuum peeling of fruits and vegetables inside the heating tank and providing it with movable buckets, while a fixed support is disposed under the vacuum chamber.

For a better understanding of the invention, reference should be made to the accompanying drawings in which there is illustrated a preferred embodiment of the invention.

Figure 1:
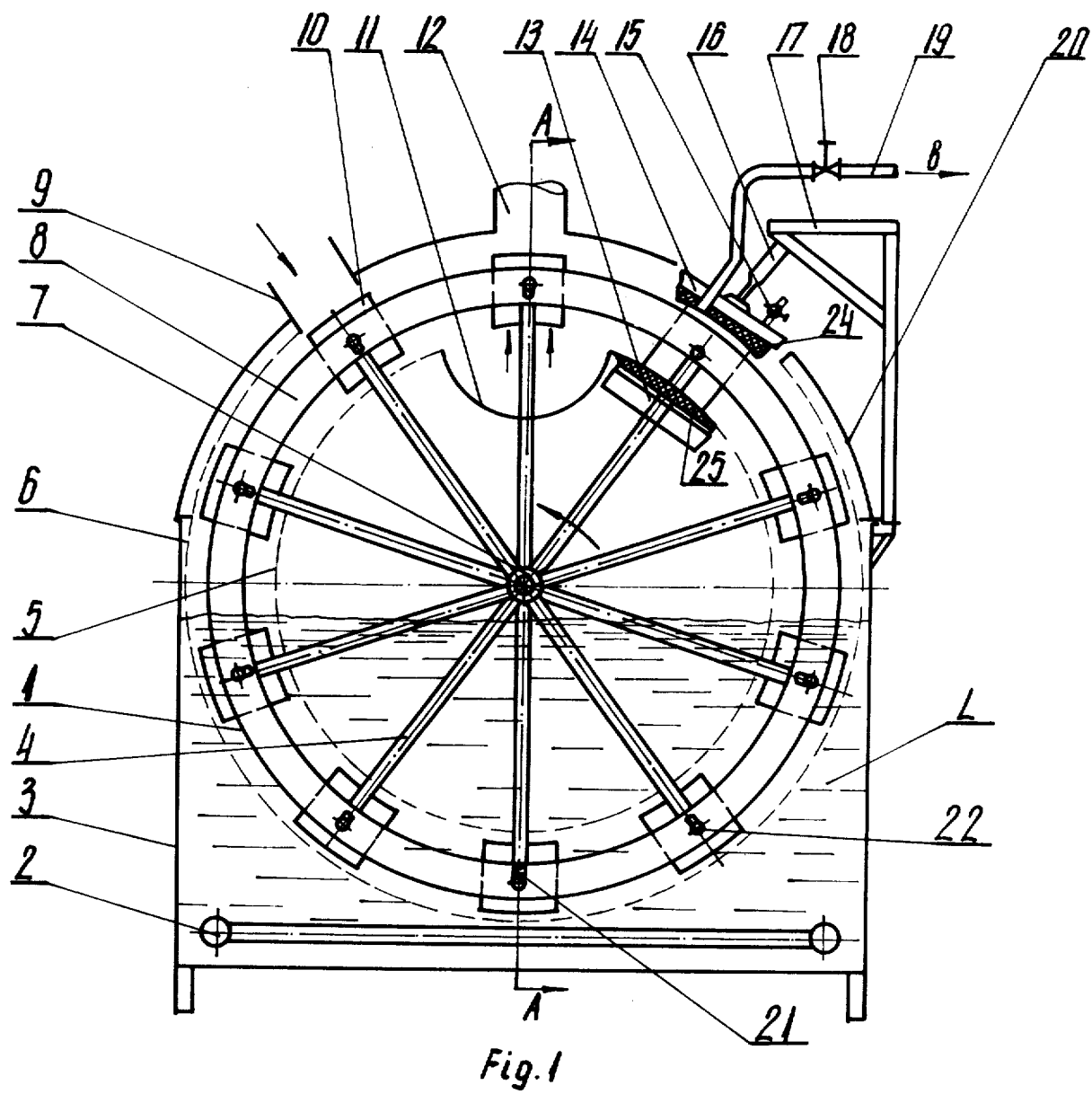
FIG. 1 is a diagrammatic vertical cross-section through the machine for vacuum peeling fruits and vegetables, such machine having movable buckets and a fixed support for the vacuum chamber.
Figure 2:
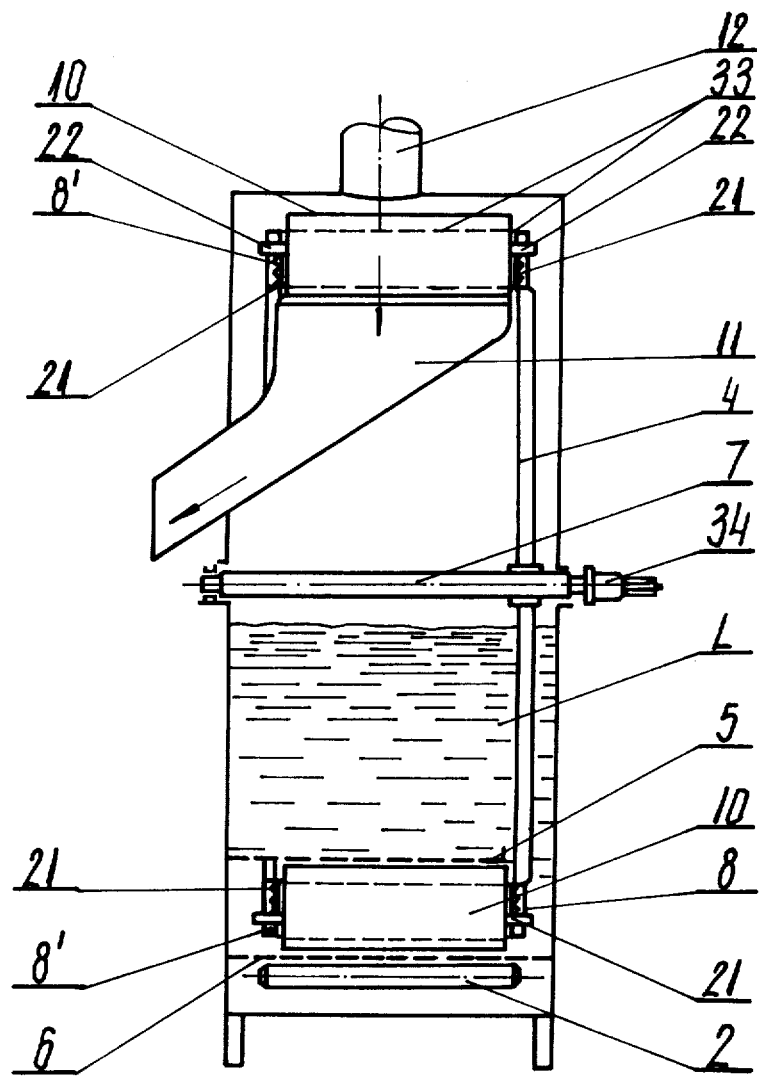
FIG. 2 is a cross-sectional view taken along line A—A of FIG. 1.

Turning now to the embodiment illustrated in FIGS. 1 and 2, there is shown a tank 3 containing liquid L which is heated to an appropriate temperature by a steam coil 2. Disposed within the tank 3 for rotation about a horizontal transverse axis is a rotor 1, made up of a plurality of equally angularly radially directed spokes 4 affixed to a driven rotatable sleeve mounted upon a horizontal shaft 7 driven by suitable means 32 shown in FIG. 2. Mounted on the outer ends of the spokes 4 is a ring 8 disposed coaxial of the shaft 7 and connected with a similar parallel mounted ring 8', by means of connections 33 shown in FIG. 2. Buckets 10 of parallelepiped shape are mounted in the rings 8 and 8', the buckets having oppositely directed trunions or stub shafts 22 mounted on their opposite ends. The stub shafts on the right-hand end (FIG.2) of the buckets are mounted in radially directed slots in the rings 8 and 8' and are constantly urged in a radially outward direction by coil compression springs 21 as shown in FIG.2. A similar ring, designated 8', is disposed at the other end of the buckets 10 and has similar radially directed slots receiving the stub shafts on the left-hand ends of the buckets 10. Coil compression springs are also disposed between such last-named stub shafts and the ring 8'.

Two concentric screens or perforated cylinders 5 and 6, disposed concentric with the rotor 1, are affixed to the left-hand wall (FIG. 2) of the tank 3, the outer, larger diameter screen 6 spanning the space between the opposite side walls of the tank and being affixed thereto, screen 6 preventing the escape of fruit or vegetables from the open radially outer ends of the buckets 10. The inner, smaller diametered screen 5 projects from the left-hand wall of the tank (FIG. 2) to a position short of the spokes 4, such screen confronting the open, radially inner end of each of the buckets 10 to prevent the escape of fruit or vegetables from the buckets. As is apparent in FIG. 1, the tank 3 is provided above the upper level of the liquid L with a hood portion, such hood portion being provided with a feed chute 9 for reception of fruit or vegetables, and with a centrally disposed air vent conduit 12. The outer screen 6 extends from the left-hand wall of the feed chute 9 to a position adjacent the vacuum applying station of the machine, to be described. The inner screen 5 extends from a position somewhat to the right of the inner end of the feed chute 9 as it is shown in FIG. 1 to the vacuum applying station. As is apparent in FIGS. 1 and 2, the liquid L, which extends upwardly somewhat short of the shaft 7, has a depth sufficient for the immersion of about one-half of the buckets 10 at all times.

In its upper part, the inner sieve or perforated cylinder 5 is divided with a discharge chute 11. The above-mentioned vacuum station is positioned in advance of the chute 11, assuming that the rotor 1 rotates counter-clockwise as indicated in FIG. 1. At the vacuum applying station there is provided a lower resilient seal 25 which is disposed upon a fixed support 13, the sealing means 25 being of somewhat greater extent than the radially inner end of the bucket 10 which confronts it and sealing such radially inner end of the bucket when the bucket is thrust radially inwardly into engagement with it. It is to be understood that in this embodiment the rotor 1 is driven intermittently so that there is an appreciable pause in its rotation when each of the buckets 10 reaches the vacuum applying station.

At such station there is provided a vacuum chamber 14 having a contoured outer resilient sealing means 24 secured to its radially inner surface, the sealing means 24 spanning the radially outer end of the respective bucket 10 and sealing it when the vacuum chamber 14 is thrust radially inwardly toward such bucket. The vacuum chamber 14 is provided with a vacuum release valve 15. The vacuum chamber 14 is periodically advanced radially toward the bucket 10 positioned in the vacuum applying station by a presser cylinder 16 having a casing affixed to a fixed support 17 and a piston rod affixed to the vacuum chamber 14, as shown. The presser cylinder 16, which is of the double-acting type, is provided with conduits at its opposite ends and with a suitable valve or valves operated in timed relationship with the intermittent rotation of the rotor 1 so as to advance the vacuum chamber 14 radially inwardly and to retract it radially outwardly at appropriate times in the cycle of operation of the machine. The vacuum chamber 14 is connected to a source of vacuum or reduced pressure by a conduit 19 in which there is interposed a quick-acting vacuum valve 18 which is also automatically operated in the proper time sequence so as to be synchronized with the intermittent rotation of the rotor 1, and with the reciprocation of the vacuum chamber 14. In the embodiment shown in FIGS. 1 and 2 the cover 20 for the tank is readily removable from the tank proper so as to facilitate maintenance of the machine.

The above-described machine operates as follows:

The rotor 1 with the buckets 10 rotates periodically, while the vacuum chamber 14 performs a reciprocating motion. The quick-acting vacuum valve 18 and the valve 15 for release of the vacuum are normally closed. The tank 3 is filled with the working liquid L, and the level of the liquid is maintained so as always to cover half of the buckets 10. The liquid is maintained at a constant elevated temperature by means of the steam coil 2, such heating being governed by means of a thermoregulator of a well-known type, not shown. When a bucket is positioned in alignment with the feeding chute 9, the respective bucket is filled with raw material. During the next following indexing rotation of the rotor 1, the filled bucket 10 is introduced between the perforated cylinders or screens 5 and 6, which close the openings therein at its radially inner and outer ends. The filled bucket then passes into the working liquid L, wherein the blanching of the material takes place, following which it is eventually advanced to the vacuum applying station.

At such station, the vacuum chamber 14 is moved radially inwardly toward the axis of the rotor 1 and presses the respective bucket 10. The coil compression springs 21 are compressed so that such bucket 10 starts to move radially inwardly toward its inner end position together with the vacuum chamber 14. Such motion of the vacuum chamber and bucket continues until the inner opening of the bucket engages the seal 25. Thus both openings of the bucket 10 are sealed simultaneously. Following this, the vacuum valve 18 is opened and there is generated a vacuum inside the bucket 10 such that the peeling of the vegetables or fruit contained therein is effected. The vacuum valve 18 is then closed after a suitable period and the valve 15 is opened for admitting air under atmospheric pressure to the vacuum chamber 14. The vacuum chamber 14 is then returned radially outwardly into its initial position. Under the action of springs 21, bucket 10 is also returned to its terminal outer position, while rotor 1 is again indexed into a new position passing a new bucket to the vacuum applying station and a new portion of the cycle is started.

Figure 3:
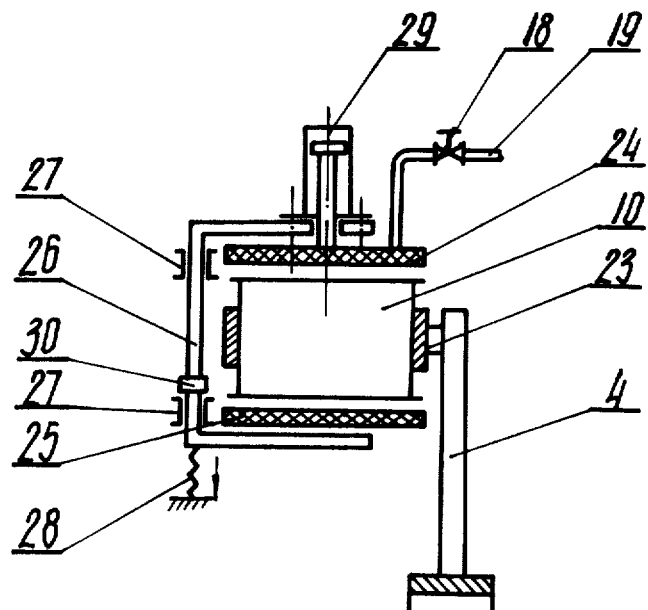
FIG. 3 is a view in cross-section illustrating a rotor design with rigid buckets and a movable vacuum chamber.

In FIG. 3 there is shown a second embodiment of the rotor of the machine of the invention. In such embodiment the buckets 10 are fastened rigidly to the spokes 4 while the vacuum chamber is movable. The buckets 10 are rigidly fastened to the spokes 4 of rotor 1 by means of brackets 23. The vacuum chamber comprises a generally U-shaped member 26 having spaced horizontal leg portions, the bight portion of the member 26 being guided for vertical movement by vertically spaced guiding sleeves 27. The member 26 is constantly urged upwardly by a coil compression spring 28, and is provided with a motion limiting collar 30 affixed to the bight thereof above the lower guide 27. A bottom sealing plate in the form of a resilient seal 25 is affixed to the lower arm of the member 26. On the upper arm of the member 26 there is fastened a power cylinder 29 having a piston and piston rod, an upper sealing member 24 being secured to the lower end of the piston rod, as shown. The vacuum chamber is provided with a vacuum conduit 19 in which there is interposed a quick-acting vacuum valve 18.

When the piston of the power cylinder 29 is withdrawn into its cylinder, the member 26 is thrust downwardly against the action of the spring 28 into the lower terminal position thereof wherein the collar 30 engages the lower guide member 27. In such position of the member 26, the distance between the opposed sealing plates 24 and 25 is at a maximum value and sealing plates 24 and 25 are apart from bucket 10, i.e., the vacuum chamber is open. It is so while the rotor 1 rotates. When the rotor 1 stops rotating, the piston of the power cylinder 29 is thrust into its extended outer position, the upper sealing plate 24 is in sealing engagement with the upper end of the bucket 10 and the member 26, together with the lower sealing plate 25, is lifted until the lower sealing plate 25 is in sealing engagement with the lower end of the bucket 10, i.e., the vacuum chamber is closed. The bucket 10 is thus sealed, and a vacuum is thereafter generated within it by operation of the quick-acting vacuum valve 18 and the other parts of the machine, which are similar to those above-described in connection with FIGS. 1 and 2, in the manner also described in connection with such first disclosed embodiment. After vacuumizing of the bucket (the product in it is peeled), the piston is drawn back into the cylinder, lifting upwards the upper sealing plate 24, while at the same time spring 28 draws member 26 together with the lower sealing plate 25 downwards, i.e., the vacuum chamber is opened and the rotor can turn to begin a new cycle.

Figure 4:
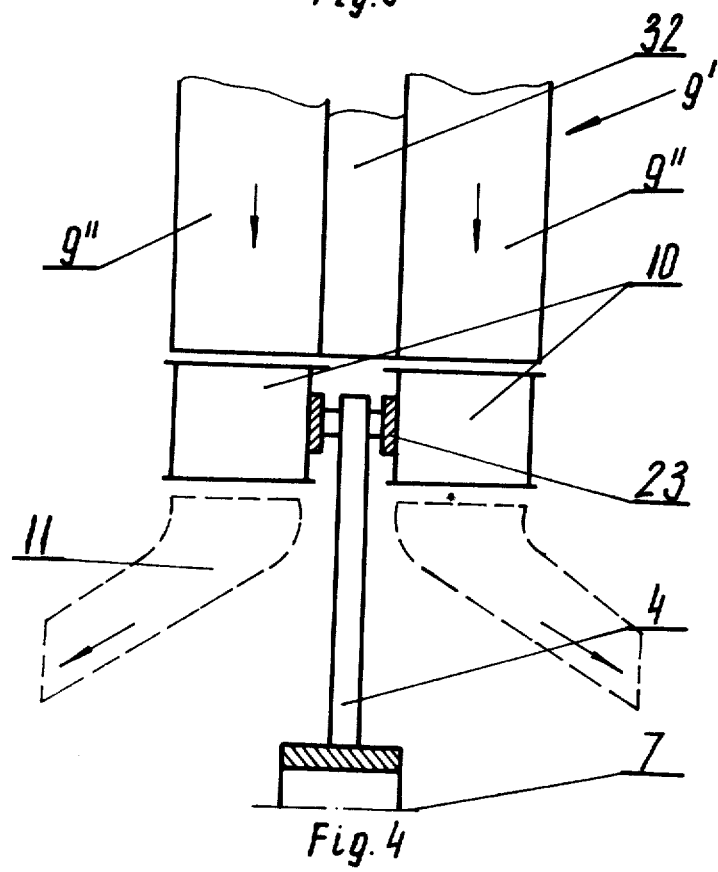
FIG. 4 is a view in cross-section illustrating a rotor with buckets on both sides.

FIG. 4 illustrates a further embodiment of the machine of the invention. In such embodiment the spokes 4 of the rotor each support two similar buckets 10, the buckets being mounted on opposite sides of the spoke. This design entails a machine of greater width, but the productivity of the machine is doubled. As shown in FIG. 4, the machine is provided with a feeding chute 9' having two sub-chutes 9" which are separated from each other by a central partition member 32.

Although the invention is illustrated and described with reference to a plurality of preferred embodiments thereof, it is to be expressly understood that it is in no way limited by the disclosure of such a plurality of embodiments, but is capable of numerous modifications within the scope of the appended claims.

What is claimed is:

1. In an apparatus for vacuum-peeling fruits and vegetables, a tank adapted to contain treating liquid, means associated with the tank for heating such liquid, a rotor mounted within the tank for rotation in a vertical plane about a horizontal axis, a plurality of buckets individually carried at circumferentially spaced portions of the rotor for receiving fruits and vegetables to be treated, means for rotating the rotor to advance the buckets through the treating liquid in succession, a vacuum-applying station cooperable with the successive buckets after they emerge from the treating liquid, a delivery chute for charging fruits and vegetables into the buckets, and a removal chute for discharging fruits and vegetables after they have been treated to vacuum in the vacuum-applying station, the improvement wherein the buckets have open radially inner and outer surfaces; in which the vacuum-applying station is disposed in the tank in the path of rotation of the successive buckets; and in which the vacuum-applying station comprises, in combination, a pair of radially opposed bucket seals individually engageable with the radially inner and outer surfaces of the bucket, means to sealingly engage said bucket seals with said inner and outer surfaces including means supporting a first one of the bucket seals for radial movement toward and away from one of the inner and outer surfaces of the bucket, and vacuum chamber means coupled to the movably supported first one of the bucket seals.

2. Apparatus as defined in claim 1, in which the rotor comprises a plurality of spokes extending radially outwardly in circumferentially spaced relation, and means defining a plurality of radial slots in the outer portion of the respective spokes; and in which the apparatus further comprises means for mounting the respective buckets in the associated slots of the spokes, and biasing means associated with the slots for individually urging the mounted buckets toward a radial extreme position in the slot closest to the movably supported one of the bucket seals in the vacuum-applying station when such bucket is rotated into registration with such station.

3. A machine for vacuum peeling fruits and vegetables according to claim 1, wherein the rotor is provided with rigid buckets, the vacuum applying station comprising a vacuum chamber having a movable upper sealing plate and a movable bottom sealing plate, and means for simultaneously applying the sealing plates to the respective ends of the bucket in the vacuum applying station.

4. A machine for vacuum peeling fruits and vegetables according to claim 1, wherein the rotor is provided on both sides with buckets, a removal chute, and a vacuum chamber, while the delivery chute is divided by an internal wall into two parts disposed over the respective rows of buckets.

* * * * *